No. 670,487. Patented Mar. 26, 1901.
I. M. VAN WAGNER.
GAME DEVICE.
(Application filed June 14, 1900.)
(No Model.)
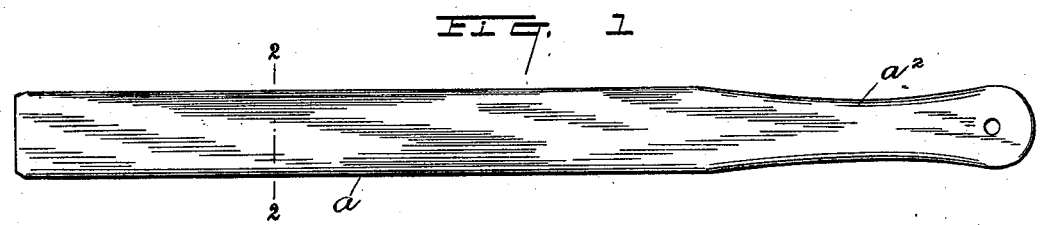
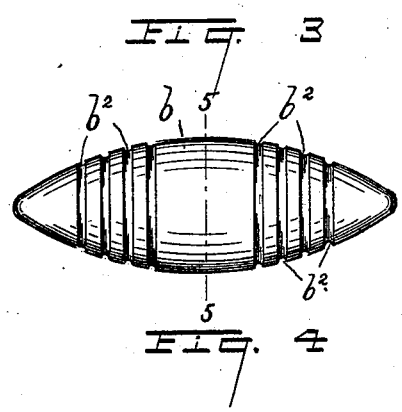
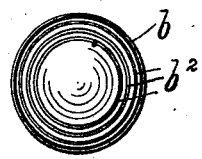
WITNESSES
Elwood Bell
F. A. Stewart
INVENTOR
Isaac M. Van Wagner.
By
Edgar Yatello
ATTORNEYS
THE NORRIS PETERS CO., PHOTO-LITHO., WASHINGTON, D. C.

UNITED STATES PATENT OFFICE.

ISAAC M. VAN WAGNER, OF NYACK, NEW YORK.

GAME DEVICE.

SPECIFICATION forming part of Letters Patent No. 670,487, dated March 26, 1901.

Application filed June 14, 1900. Serial No. 20,240. (No model.)

*To all whom it may concern:*

Be it known that I, ISAAC M. VAN WAGNER, a citizen of the United States, residing at Nyack, in the county of Rockland and State of New York, have invented certain new and useful Improvements in Game Devices, of which the following is a full and complete specification, such as will enable those skilled in the art to which it appertains to make and use the same.

This invention relates to the boys' game of "tip-cat," and particularly to devices for playing the same; and the object thereof is to provide improved devices of this class, and especially a "cat" of improved form and construction, which may also serve as a ball in various games.

The invention is fully disclosed in the following specification, of which the accompanying drawings form a part, in which the separate parts of my improvement are designated by the same letters of reference in each of the views, and in which—

Figure 1 is a side view of a bat which I employ; Fig. 2, a cross-section thereof on the line 2 2; Fig. 3, a side view of the cat; Fig. 4, an end view thereof, and Fig. 5 a cross-section on the line 5 5 of Fig. 3.

In the practice of my invention I provide a bat $a$, (shown in Figs. 1 and 2,) which is preferably flat except at one end, where it is formed into a handle $a^2$, and the width of the flat portion thereof is about three times as great as the thickness, the sides and edges of the body portion of the bat being parallel, and said bat is preferably composed of wood.

In Figs. 3 to 5, inclusive, I have shown my improved cat $b$, which is cylindrical in cross-section and tapered from the center toward both ends, the form thereof being such that if divided in the middle the end portions thus formed would each be substantially conical in shape. The cat is composed of rubber, rubber and canvas, or other suitable elastic material and is preferably made hollow, but may be solid in cross-section, if desired, and the ends thereof or the central portions of said ends are roughened in any desired manner; but in the form of construction shown in the drawings I provide annular grooves $b^2$, which form the desired roughened surface, and it will be apparent that these grooves may be provided or that the ends of the said cat may be roughened as desired when the said cat is made solid as well as when made hollow, as shown in the drawings. A cat thus formed possesses great elasticity, and the direction taken thereby when hit by the bat would depend entirely upon the manner in which the same is struck or the portion thereof which receives the blow. It will also be apparent that if the said cat is struck fairly in the middle by the flat side of the bat the trajectory of the said cat will be the same as though it were made cylindrical in form, and this will also be true if the said cat be struck fairly on the end, and it is in order to accomplish this result that I provide a bat of the form described, which is rectangular in cross-section and the width of which is materially greater than the thickness thereof.

Having fully described my invention, I claim as new and desire to secure by Letters Patent—

A game device comprising a "cat" of oblong form and cylindrical in cross-section and provided with pointed or conical ends, said device being hollow and being composed of elastic material and the end portions thereof being provided with annular grooves in the surface thereof, substantially as shown and described.

In testimony that I claim the foregoing as my invention I have signed my name, in presence of the subscribing witnesses, this 13th day of June, 1900.

ISAAC M. VAN WAGNER.

Witnesses:
F. A. STEWART,
C. C. OLSEN.